(12) United States Patent
Lyons et al.

(10) Patent No.: US 6,922,549 B2
(45) Date of Patent: Jul. 26, 2005

(54) ERROR VECTOR MAGNITUDE SELECTION DIVERSITY METRIC FOR OFDM

(75) Inventors: Daniel Joseph Lyons, Chippewa Lake, OH (US); Brian Hart, Wollstonecraft (AU)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/698,588

(22) Filed: Oct. 31, 2003

(65) Prior Publication Data

US 2005/0095987 A1 May 5, 2005

(51) Int. Cl.[7] .......................... H04B 17/00; H04B 1/10; H04B 15/00; H04B 1/06; H04B 7/00
(52) U.S. Cl. .............. 455/67.13; 455/277.1; 455/277.2; 455/65
(58) Field of Search .................... 455/277.2, 277.1, 455/65, 67.13, 63.1, 63.4, 67.11, 269, 272, 278.1

(56) References Cited

U.S. PATENT DOCUMENTS

| | | | |
|---|---|---|---|
| 5,339,452 A | * | 8/1994 | Sugawara ................ 455/277.2 |
| 5,530,926 A | * | 6/1996 | Rozanski ................ 455/277.1 |
| 5,809,430 A | | 9/1998 | D'Amico ................ 455/525 |
| 5,815,811 A | | 9/1998 | Pinard et al. ............ 455/434 |
| 6,067,449 A | * | 5/2000 | Jager ...................... 455/277.2 |
| 2002/0118724 A1 | * | 8/2002 | Kishimoto et al. ......... 375/132 |
| 2003/0100282 A1 | * | 5/2003 | Kandala ................ 455/234.1 |
| 2004/0014443 A1 | * | 1/2004 | Nakao et al. .............. 455/130 |

* cited by examiner

Primary Examiner—Vivian Chin
Assistant Examiner—Raymond B. Persino
(74) Attorney, Agent, or Firm—Dov Rosenfeld Inventek

(57) ABSTRACT

Describe herein is an apparatus for inclusion in a station of a wireless network, and a method implemented in a station of a wireless network. The method includes wirelessly receiving data via each of a plurality of antennas, the data corresponding to a packet of information transmitted from a remote station, sampling the received data corresponding to the received packet to form data samples for each of the antennas, and determining a measure of signal quality from samples of the received data for each of the antennas. The method further includes selecting one of the plurality of receive antennas as the antenna for receiving from the remote station according to the determined measure of signal quality.

39 Claims, 14 Drawing Sheets

ERROR VECTOR MAGNITUDE SELECTION DIVERSITY METRIC FOR OFDM

BACKGROUND

This invention is related to wireless networks, and in particular to a wireless station that includes more than one receive antenna, and to a method of selecting the receive antenna to use according to a measure of the signal quality. In one version, the measure of the signal quality is a measure of the relative error vector magnitude (EVM).

Wireless networks such as wireless local area networks (WLANs) have recently become popular. A WLAN may be an ad-hoc network in which any wireless station (STA) may communicate directly with any other STA, or an infrastructure network in which one STA acts as an access point (AP).

The description herein will assume a wireless network that conforms to the IEEE 802.11 standard, and will use the terminology of the IEEE 802.11 standard. In particular, the invention will be described with reference to variants of the IEEE 802.11 standard that use orthogonal frequency division multiplexing (OFDM) wherein a signal is transmitted as a set of subcarriers. Such variants include IEEE 802.11a and 802.11g. The invention, however, is not restricted to such a network. For simplicity, 802.11a will be used to refer to any of the OFDM variants of the IEEE 802.11 standard.

Multipath refers to multiple transmission paths between transmit and receive antennas of stations, and causes both frequency-selective fading and space-selective fading. Frequency-selective fading means that the channel varies with frequency. Space-selective fading means that the channel is dependent upon the position of the transmit and receive antennas. FIG. 1 shows the subcarrier powers (as 802.11a channel estimates) observed for the same packet received through two vertically oriented dipole antennas separated by a half-wavelength ($\lambda/2$) in an office environment and demonstrates the existence of both frequency-selective fading and space-selective fading. In FIG. 1, the total channel 1 power is −57.2 dBm, and the total channel 2 power is −60.3 dBm. The frequency-selective fading is evident from the fact that there is significant subcarrier power variation in both channels. The space selective fading is evident from the fact that the two channels look completely different with only a $\lambda/2$ spacing between the two antennas.

As with many other digital wireless network protocols IEEE 802.11a uses forward error correction (FEC) to add redundancy to the transmitted data so that a receiver can recover the transmitted data even if certain data bits are corrupt. Combining OFDM and FEC gives 802.11a receivers the ability to recover a transmitted packet even if certain subcarriers within the packet are not recoverable. This is especially important in a multipath environment where frequency-selective fading can result in more than 30 dB of subcarrier power variation within a packet. There are frequently situations, however, that the multipath fading is too severe for 802.11a even with its inherent ability to deal with multipath. In these situations, it is necessary to implement a technique that mitigates the effects of the multipath to ensure a reliable link.

One approach that has commonly been used in wireless communications is to take advantage of the space-selective fading by using multiple receive antennas separated by a sufficient distance.

Several approaches are now discussed.

A first prior art method that uses spatial diversity with the two receive antennas includes a separate receiver connected to each receive antenna. Such a system is shown in simple form in FIG. 2. A pair of antennas 201, 202 is coupled to respective receivers 203 and 205 that fully demodulate the signals received at each antenna. The method includes fully demodulating the signal received on each antenna. The antenna selection circuit 209 accepts the demodulated output and provides control to an antenna switch 207 to selecting the data set with the least error.

A second prior art method is shown in FIG. 3. A pair of antennas 301, 302 is coupled to respective receivers 303 and 305, so this method also includes a receiver for each antenna. A combiner 307 combines signals produced by the receivers. The second method includes combining the two signals, e.g., using maximum ratio combining or some other forms of combining, to provide a composite signal with better signal quality than either signal alone. That composite signal is then demodulated and further processed.

Many configurations are possible. In the OFDM version shown, the receivers 303 and 305 each include an analog to digital converter to produce samples signals, an FFI processor (not shown) and a demodulator to produce symbols. The receivers 303 and 305 also each produce estimates of the channel. The combiner 307, in this case a maximum ratio combiner, uses the channel estimates and the demodulated symbols to produce combined demodulated symbols. An OFDM signal processing circuit 309 converts the symbols to bits, de-interleaves, performs any necessary depuncturing, Viterbi decodes, de-scrambles, and performs a CRC check as is known in the art.

The disadvantage of these two prior art methods, however, is that they both require a receiver per receive antenna.

A much more economical approach is to have a single receiver that can alternately connect to each of the two antennas during the start of the packet and select the antenna based on some decision metric. This approach is referred to as selection diversity, and is the subject of the present invention. Selection diversity is commonly used in 802.11a stations.

One prior art decision metric is based entirely on the strength of the received signal, as indicated by the received signal strength indication (RSSI). FIG. 4 shows a conceptual design of such a receiver with two antennas 401, 402. The control circuit 403 provides a control to a switch 405 to select the signal from one or the other antenna based on signal power. The selected output of the switch is accepted by a single receiver 407.

The IEEE 802.11a physical layer (PHY) standard defines RSSI as a measure by the PHY sublayer of the energy observed at the antenna used to receive the packet. RSSI is measured by the PHY during packet reception and is passed up with the packet.

FIG. 5 shows a more practical version of a system that selects the antenna according to the RSSI. Modern receivers for WLANs typically produce the RSSI. In FIG. 5, the signals from two antennas 501, 502 are fed to a switch 503 that selects one or the other antenna for a radio receiver 505. The radio receiver produces an RSSI output. The RSSI output is fed to an antenna controller 507 that controls the switch 503. Initially, one or the other antenna is selected. After a start-of-packet is detected, the controller 507 selects one then the other antenna and compares the RSSI that results from each antenna. These RSSI values are used to differentiate the signal strength from the candidate antennas and to determine the "best" antenna according to the received signal strength.

Those in the art will recognize that the RSSI is a measure of signal strength but not signal quality. We have found that indeed the RSSI is not a good indicator of the signal quality or in itself a good measure for "best" antenna selection. An RSSI value, for example, does not account for factors that significantly reduce signal quality such as multipath.

Using the RSSI to select the "best" antenna can result in a lower throughput and latency than would happen if a measure of signal quality rather than signal strength was used for the selection.

Thus there is a need in the art for a method of selecting an antenna in a receiver that includes multiple antennas using a metric such as a signal quality measure that takes into account frequency selective fading. There also is a need in the art for a receiving method that uses multiple antennas but that does not require a receiver per receive antenna.

SUMMARY

Described herein is an apparatus for inclusion in a station of a wireless network, and a method implemented in a station of a wireless network. The method includes wirelessly receiving data via each of a plurality of antennas, the received corresponding to a packet of information transmitted from a remote station. The method further includes sampling the received data corresponding to the received packet to form data samples for each of the antennas, and determining a measure of signal quality from samples of the received data for each of the antennas. The method further includes selecting one of the plurality of receive antennas as the antenna for receiving from the remote station according to the determined measure of signal quality.

The determining of the measure of signal quality occurs prior to carrying out automatic gain control (AGC) for the data corresponding to the packet. In one embodiment, the determining of the measure of signal quality includes determining a measure of the relative EVM from samples of the received data corresponding to part of the packet.

As an example, for the case that the packet conforms to one of the OFDM variants of the IEEE 802.11 standard or a derivative thereof, such that the packet includes a preamble that includes a short symbol part that has a sequence of short symbols, the measure of the EVM is of samples of the short symbol part of the preamble.

In one embodiment, the determining the measure of the relative EVM includes determining a measure that varies monotonically with the symbol vector magnitude (SVM) in the short symbol part and a measure that varies monotonically with the error vector magnitude (EVM) per subcarrier in the short symbol part. By SVM is meant the constellation symbol magnitude due to the desired signal possibly in the presence of multipath but in the absence of noise or other EVM contributors. The determining of a measure that varies monotonically with the SVM includes performing a discrete Fourier transform (DFT) on samples corresponding to a short symbol. Furthermore, the determining of a measure that varies monotonically with the noise power per subcarrier in the short symbol part includes determining a measure of the average signal power prior to a packet arriving.

Other aspects, embodiments and features are evident from the description provided herein and the claims.

DETAILED DESCRIPTION

Described herein are a selection diversity method and an apparatus that uses the method. The method uses a decision metric for selection that includes a measure of the received signal that accounts for frequency-selective fading and colored interface. The decision metric estimates the average error vector magnitude (EVM) relative to the symbol vector magnitude (SVM) and selects the antenna with the superior metric. We call this relative measure the relative EVM (REVM). While the implementation presented herein is specific to the OFDM variants of the 802.11 standard, the invention is applicable to receivers that do not necessarily conform to the OFDM variants of the 802.11 standard.

Figure 6:
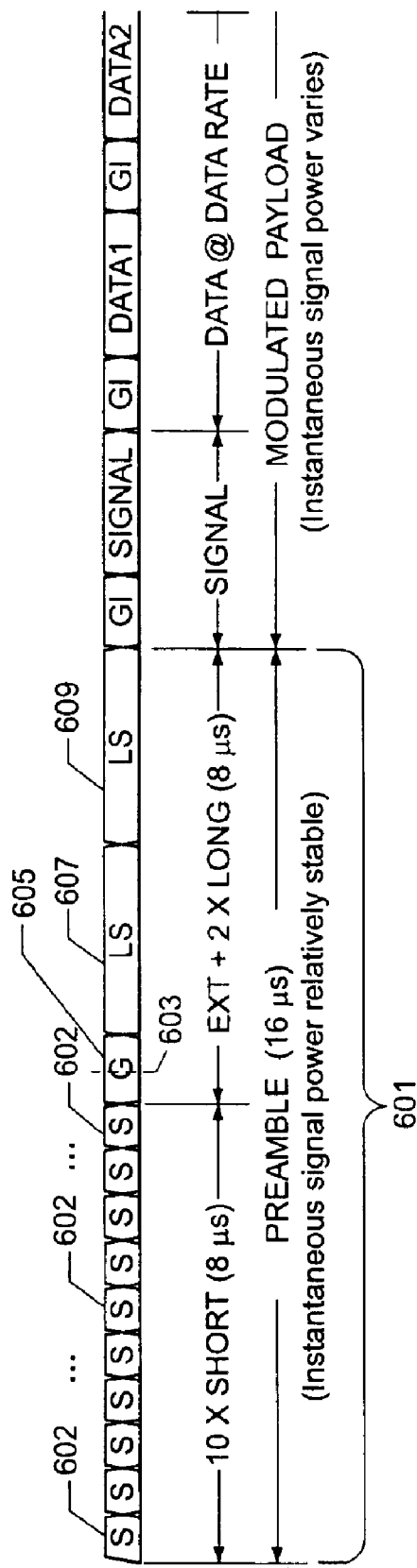
FIG. 6 shows a typical OFDM packet that conforms to the IEEE 802.11a standard and that includes a preamble with a short and a long preamble period that precedes the signal payload.

One embodiment of the invention is applicable to communicating using OFDM packets that conform to the OFDM variants of the IEEE 802.11 standard. FIG. 6 shows the structure of an OFDM packet as used in IEEE 802.11a WLANs. The packet starts with a preamble 601 used for start-of-packet (SOP) detection, automatic gain control (AGC), diversity selection, e.g., using an embodiment of the diversity selection method of the present invention, and various other synchronization functions. The preamble is followed by the modulated payload, which starts with a known (low) data rate SIGNAL field and DATA fields. Each data field includes a guard interval (cyclic extension).

The preamble 601 is 16 μs long and has two 8 μs parts: a first part ("short preamble part") consisting of set of 10 short symbols 602, and a second part ("long preamble part") consisting of two long symbols 607 and 609, and a cyclic extension part (guard interval) 605. In a typical system, the short preamble part provides for the SOP detection, AGC, diversity selection, coarse frequency offset estimation and timing synchronization, while the long preamble part then provides for channel estimation and fine frequency offset estimation.

In order to provide enough time for further preamble processing, SOP detection, AGC and diversity detection need to be completed within about 6 μs, i.e., with 3 or so short symbols remaining in the short preamble period for further preamble processing.

Figure 7:
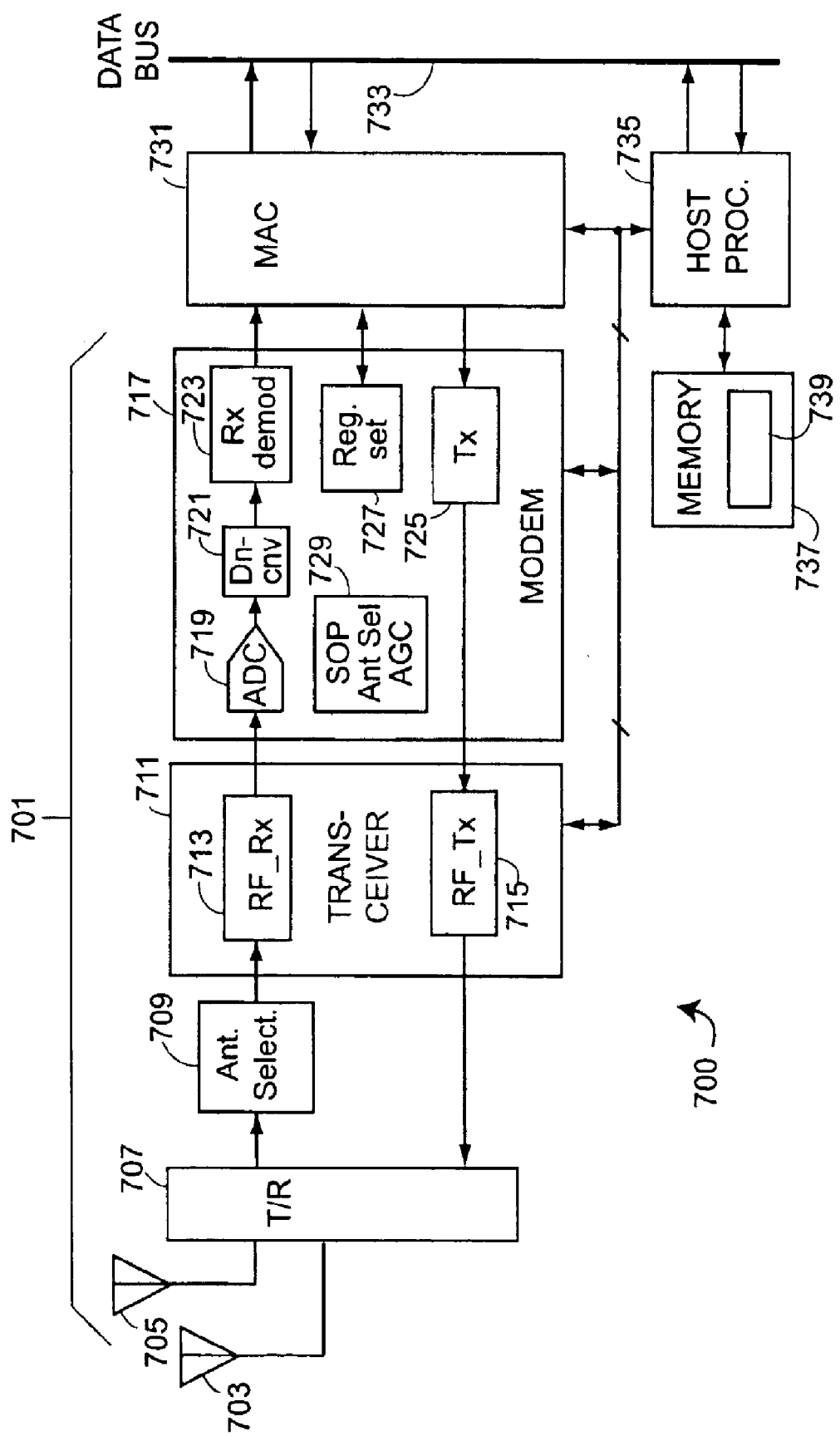
FIG. 7 is a functional block diagram of a wireless station 700 that includes an embodiment of the present invention.

FIG. 7 is a functional block diagram of a wireless station 700 that includes an embodiment of present invention. The station 700 may, for example, implement an access point (AP) or may implement a client station. The station 700 includes a physical layer interface (PHY) 701 that includes at least two antennas 703 and 705 for the frequency or frequencies of service (approx. 2.4 GHz and/or approx. 5 GHz), a transmit/receive (T/R) switch 707 for half-duplex operation and an antenna selector 709, e.g., a switch, to select the antenna, e.g., the receive antenna from the plurality of antennas 703, 705 according to one or more aspects of the present invention. The output of the antenna selector is coupled to a wireless receiver and transmitter (transceiver) 711 that includes receiver radio frequency (RF) electronics 713, and a wireless transmitter that includes transmit RF electronics 715. The PHY 701 also includes a modem 717 that includes a demodulator 723 and a modulator 725. The receive path to the demodulator includes an analog-to-digital converter (ADC) 719 to produce samples of the received signal. One embodiment of the receiver 711 produces signals that, while called baseband, are actually low IF signals having a 20 MHz bandwidth between 10 and 30 MHz. Downconverter 721 converts these to true quadrature (I and Q) baseband signals. The system 700 further includes a medium access controller (MAC processor, or simply MAC) 731 for layer-2 processing. A computer system databus 733 is included in one embodiment, as is a host processor 735.

In one embodiment, a memory 737 is included for data buffering and program storage. The memory 737 may be directly coupled to the host or to the MAC or to both.

Alternate embodiments do not include the host processor. The host processor function may, for example, be incorporated with the MAC 731.

The modem 717 includes a circuit 729 that implements start of packet (SOP) detection, automatic gain control (AGC) and, the antenna selection method of the present invention. Thus, in addition to the payload data between the modem 717, radio transceiver 711, and MAC 731, control information such as gain settings for the radio receiver 713 and antenna selection signals to the antenna selector 709 are sent from the circuit 729. Other data is communicated between the transceiver and the modem. Furthermore, other data may be communicated between the modem and the MAC, and between the modem and the host (if included).

A set of registers 727 is included. In one embodiment, the MAC processor 731 has access to at least some of the set of registers 727. Some registers can be loaded with data from the MAC 731, others provide data for the MAC processors, while some may provide for two-way communication.

One embodiment of system 700 is compatible with one or more OFDM variants of the IEEE-802.11 standards for wireless local area network (LAN) applications. The RF transceiver 711 and modem 717 constitute a complete wireless engine for OSI Layer-1 physical layer (PHY) functionality for one or more of the IEEE-802.11 PHY variants, and the (MAC) 731 is IEEE-802.11 compatible.

One embodiment of the system 700 is preferably constructed on a single printed circuit board (PCB). The RF transceiver 711 and modem 717 are each implemented with CMOS technology in individual integrated circuits (chips).

Figure 8:
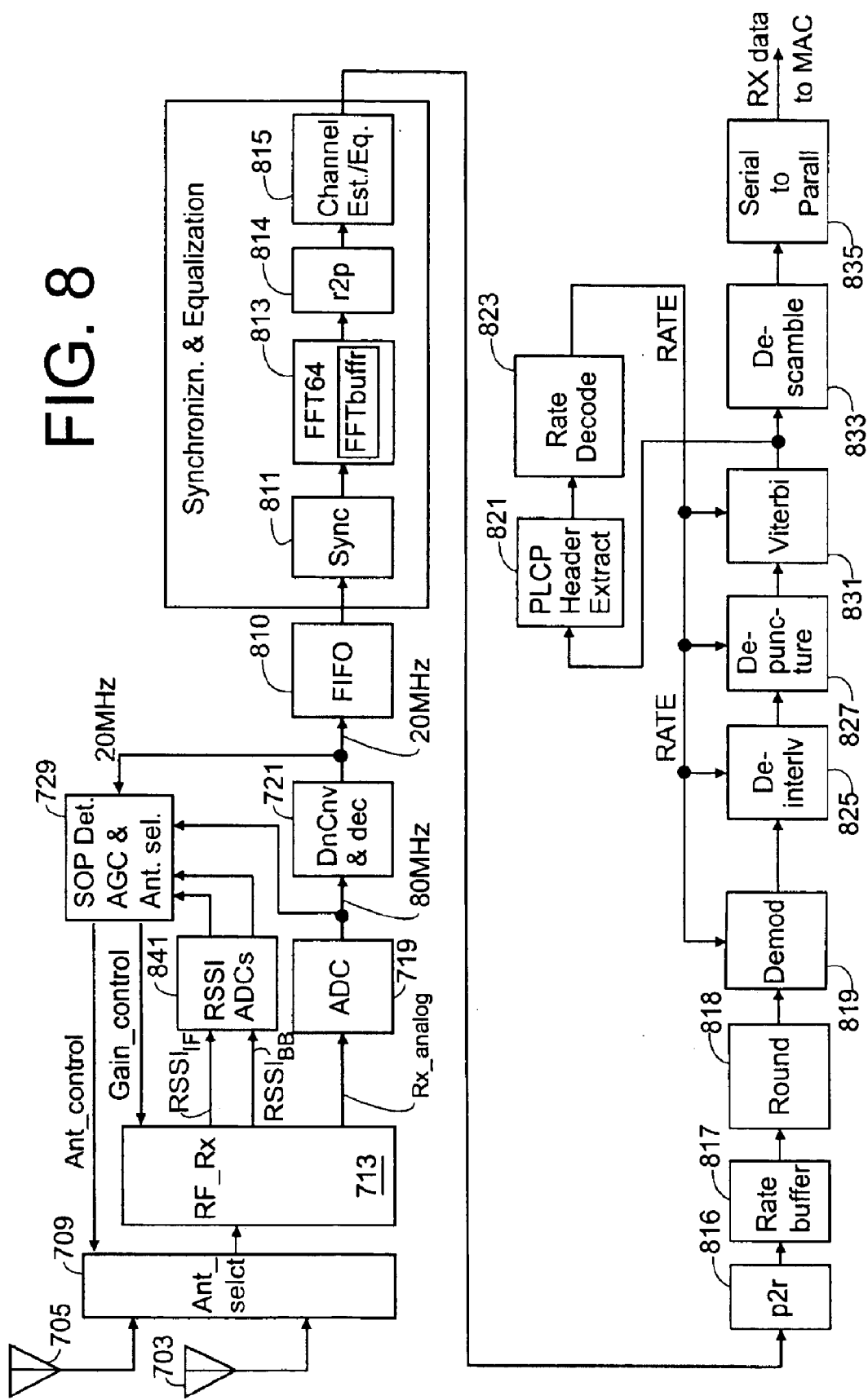
FIG. 8 shows a simplified block diagram of the OFDM receiver part of the modem 717 shown in FIG. 7.

FIG. 8 shows a simplified block diagram of the OFDM receiver part of the modem 717 shown in FIG. 7. The embodiment shown works with a version of the receive RF electronics 713 that produces a low IF signal with a 20 MHz bandwidth requiring further downconversion to obtain baseband I, Q signals. The ADC 719 digitizes the analog received signals. Element 721 further downconverts and decimates the signals to produce I and Q samples at 20 MHz that enter a first in first out (FIFO) buffer 810 and a time synchronization unit 811. Synchronization is achieved by one or more methods, such as estimating the short preamble's short symbol timing using a correlator and estimating the guard interval timing of the long preamble. The synchronization unit further includes frequency estimation and frequency correction using a rotator (not shown for simplicity). The output of the rotator is presented to a 64-sample input buffer of a 64-sample discrete Fourier transformer 813 (FFT64) for time-to-frequency conversion.

The Fourier transformer 813 transforms the complex baseband time-domain samples of the OFDM symbols of the received packet into complex-valued frequency domain samples by a DFT operation. The IQ frequency domain samples from Fourier transformer 813, in bit-reversed frequency order, are converted to polar coordinates by a rectangular-to-polar (amplitude/phase) converter 814—cordic in one embodiment. The result is input into a channel response estimator/equalizer block 815 that estimates the channel response and that equalizes the signals according to the estimated channel response. Also included in estimator/equalizer block 815 are a channel state information detection circuit and a pilot tone correction unit.

The corrected signals are converted back to I,Q (rectangular coordinate) form by a second coordinate converter 816. The output is thus a sequence of IQ frequency samples ready for demodulation.

In alternate embodiments, channel estimation occurs in the IQ-domain before the Cordic, while equalization occurs after the Cordic.

A packet according to the OFDM standard includes a field called the SIGNAL field that contains information on how the rest of the packet is modulated. In particular, the SIGNAL field is always transmitted as a 6 Mbps rate 1/2 binary phase shift key (BPSK) signal, and determines the modulation type and coding rate of the remainder of the packet, shown as RATE in FIG. 8.

A rate buffer 817 in the form of a second FIFO is included between the second coordinate converter 816 and a demodulator 819. The rate buffer 817 buffers the received frequency samples from the end of the SIGNAL field for a number clock cycles equal to the latency (in clock cycles) through the later parts of the receiver needed for processing the SIGNAL field, including demodulating and decoding to obtain the RATE information. This RATE information from the SIGNAL field is used to set up the demodulator and Viterbi decoder parameters before the remainder of the packet is input into the demodulator chain. Hence, the remainder of the packet needs to be buffered until at least the RATE information has been successfully decoded.

The output samples (I,Q) of the rate buffer are demodulated by the demodulator 819. In one embodiment, the samples are first rounded from 12-bits for each of I and Q to 6 bits for each by a rounder 818. The demodulator 819 demodulates depending on the modulation specified by RATE. The demodulated symbols from demodulator 819 are de-interleaved by interleaver 825 and symbols inserted in depuncturer 827 to ensure the symbols have the coding rate to match the decoder included in this one embodiment. The output symbols of symbol inserter 827 are input to a Viterbi decoder 831 and descrambled by descrambler 833. The de-interleaving, depuncturing, and Viterbi decoding depend on the RATE. The series of descrambled symbols are converted to parallel form by serial-to-parallel converter 835 for input to the MAC processor.

Initially, the demodulator, de-interleaver, decoder, etc. are set to process the SIGNAL field. Once the RATE information, including the modulation scheme, is determined, these elements are set to demodulate the data frames of the payload. In this embodiment, the Viterbi decoder 831 is a 1/2-rate decoder. The depuncturer 827 is included to insert dummy signals to convert non-1/2 rate data into data suitable for the Viterbi decoder 831.

The receiver generates the received data of a packet and passes the data to the MAC processor 731. Additional information also is passed on to the MAC layer processor, including information about the packet. In one embodiment, such information includes a measure of the EVM of the SIGNAL part, a measure of the EVM of the data part of the packet, and the RSSI.

The RF receive electronics 713 includes an intermediate frequency (IF) section that includes a filter. The RF receive electronics 713 includes two analog RSSI circuits that provide the pre-filter and post-filter signal strength values, denoted $RSSI_{IF}$ and $RSSI_{BB}$, respectively. Comparing the two values provides a measure of how much of the signal strength is filtered by the filter, and thus provides a measure of the out-of-channel interference. These signals are digitized by a pair of RSSI ADCs 841 and used for automatic gain control (AGC) by the SOP, AGC, and Antenna select circuit 729.

AGC occurs in several stages as described in U.S. patent application Ser. No. 10/622,175 filed Jul. 17, 2003 to inventors Adams, et al., titled "ADAPTIVE AGC IN A WIRELESS NETWORK RECEIVER." Such U.S. patent application Ser. No. 10/622,175 is incorporated herein by reference.

In this description, the terms pre-AGC and post-AGC will refer to the time prior to AGC adjustment and after AGC adjustment, respectively, within a packet respectively. Thus, prior to AGC, the gains are set to a default gain level.

In one embodiment, the selection diversity decision is made by unit 729 pre-AGC so that the gain can afterwards be set appropriately for the selected antenna by the AGC method. The AGC also should take place before the end of the short preamble part to allow enough time for other necessary radio functions to occur. The above referenced AGC method of U.S. patent application Ser. No. 10/622,175 includes setting the gains in a set of stages. When antenna diversity selection is included, selecting the antenna from a set of antennas replaces the first AGC stage, and thus occurs during the short preamble period and while the gains are set to a default gain level. One embodiment of the selection method takes place over two short sequence times, one short sequence period per antenna, after SOP detection.

Note that for the ODFM case, the samples need not be aligned with the short symbol boundaries since the short symbols are periodic.

One aspect of the invention is that the selection of the antenna uses a measure of the signal quality received via each antenna. That measure is related to the error vector magnitude of the signal received.

Figure 9:
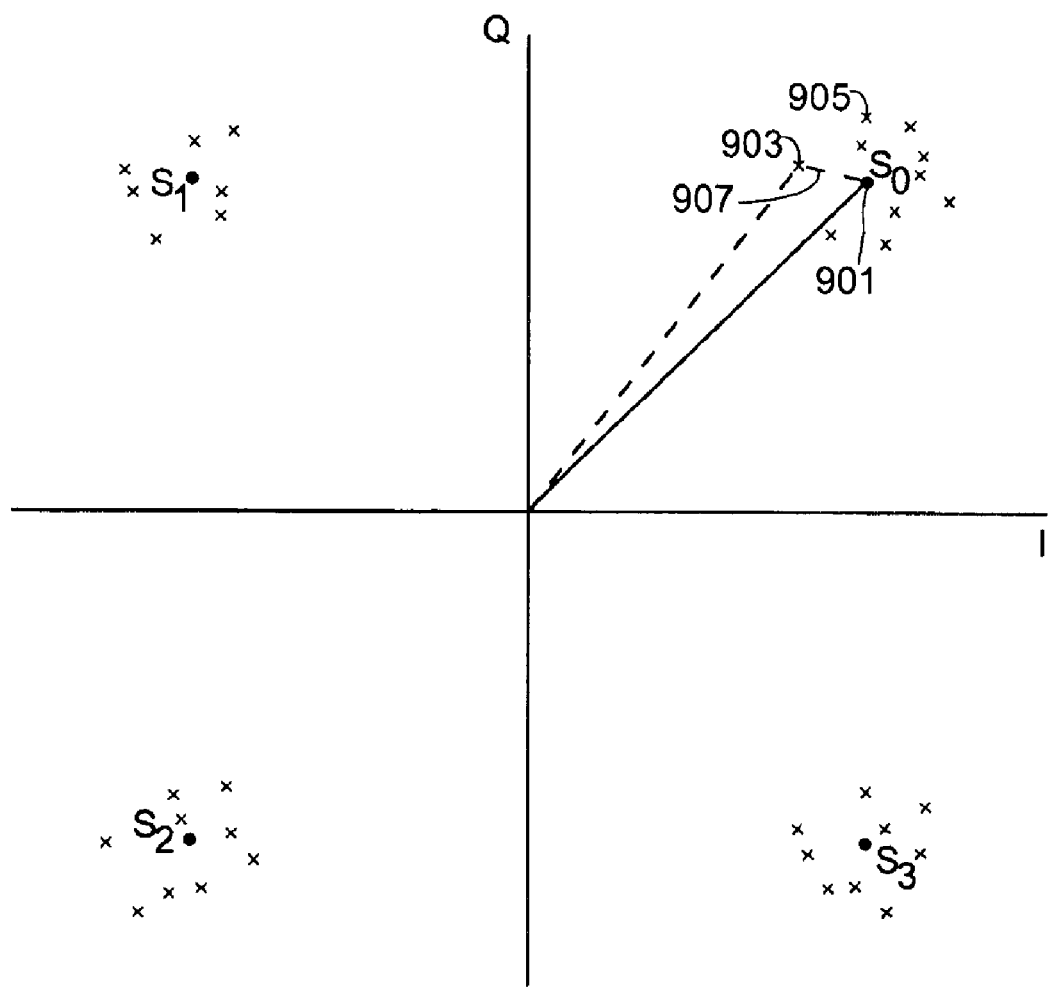
FIG. 9 shows the ideal constellation points of a QPSK symbols and a set of typical signals in order to explain the error vector magnitude, symbol vector magnitude, and relative error vector magnitude.

FIG. 9 shows an I,Q plane with a constellation of four possible symbols $S_0$, $S_1$, $S_2$, and $S_3$ for a signal that is modulated by a quaternary phase shift key (QPSK) modulation scheme. Ideally, if the transmitter and receiver were perfectly synchronized and there were no noise or signal distortions, then the measured symbol positions would fall on one of the four constellation points, i.e., at the ideal symbol positions. In practice, because of phase error and/or magnitude error that are due to synchronization errors, noise, and other signal distortion sources, however, the measured symbol positions fall on points that are not exactly at the four ideal constellation points. FIG. 9 shows many such measured symbol positions, each indicated by an "X." Two such symbol positions are shown as 903 and 905 near the S0 constellation point 901. Consider point 903. The EVM for this measured symbol position is the length of vector—907—that connects the correct constellation point—point 901—and the measured symbol position—point 903. The root mean square (RMS) EVM is the square root of the mean of the square of the lengths—e.g., length 907—of the vectors that are the errors between the correct constellation point—e.g., constellation point 901—and the measured symbol positions—e.g., point 903. The RMS EVM is then normalized by the symbol vector magnitude (SVM) which is the mean distance of the ideal symbol positions to zero, on a subcarrier-by-subcarrier basis.

OFDM uses multiple subcarriers to transmit multiple symbols simultaneously. The result of first computing the RMS normalized EVM for each of the individual subcarriers and then averaging across all subcarriers is be referred to as the relative EVM (REVM).

Thus, by "a measure of the relative EVM" in general is meant to be any measure that varies monotonically with an approximation of the EVM, e.g., with an approximation of the measure of the RMS distance between received symbols and ideal symbols, divided by the RMS distance from ideal symbols to zero. Note that in this description, the averaging is carried out after division. In alternate embodiments, the averaging is carried out after division. As will be shown later, several methods are presented for determining a measure of the relative EVM, e.g., as an approximation to the relative EVM.

The measurement of EVM is somewhat complicated by carrier leakage that causes the origin of the IQ axes to shift.

One aspect of the invention is to use the relative EVM as a measure of the quality of the received signal as a metric for antenna selection. Used properly, EVM and related measurements can pinpoint exactly the type of degradations present in a signal and can even help identify their sources.

Figure 10:
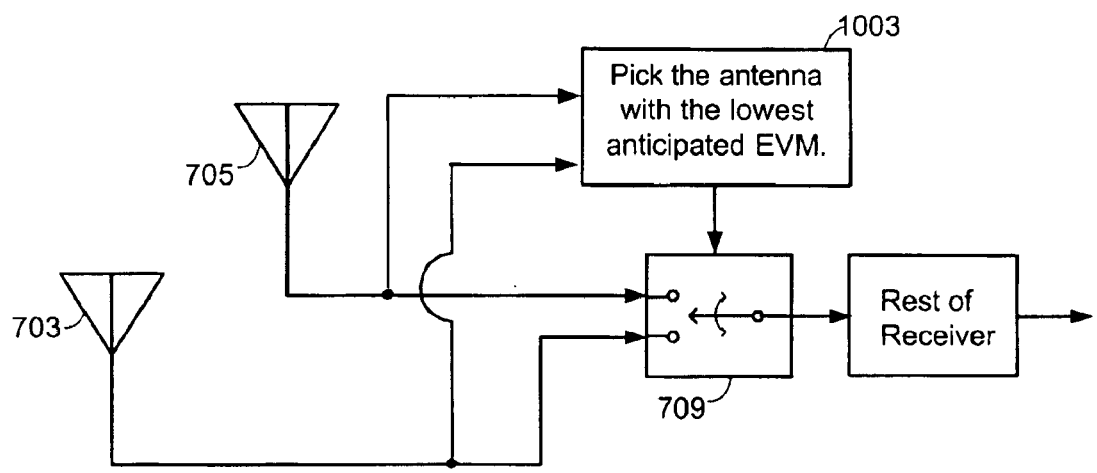
FIG. 10 shows simplified conceptual design of a wireless receiving system that selects the antenna according to a measure of the signal quality related to the relative EVM.

FIG. 10 shows simplified conceptual design of a wireless receiving system that shows two antennas 703 and 705 and an antenna control circuit 1003 that accepts signals from the antennas 703 and 705 and that provides a control signal to the antenna select switch 709 to select the antenna according to a measure of the signal quality related to the EVM. The control circuit 1003 calculates a measure (the selection metric) of the pre-AGC EVMs of the signals received via antenna 703 and 705, compares the calculated EVMs, and outputs an antenna select signal according to the superior metric.

Figure 11:
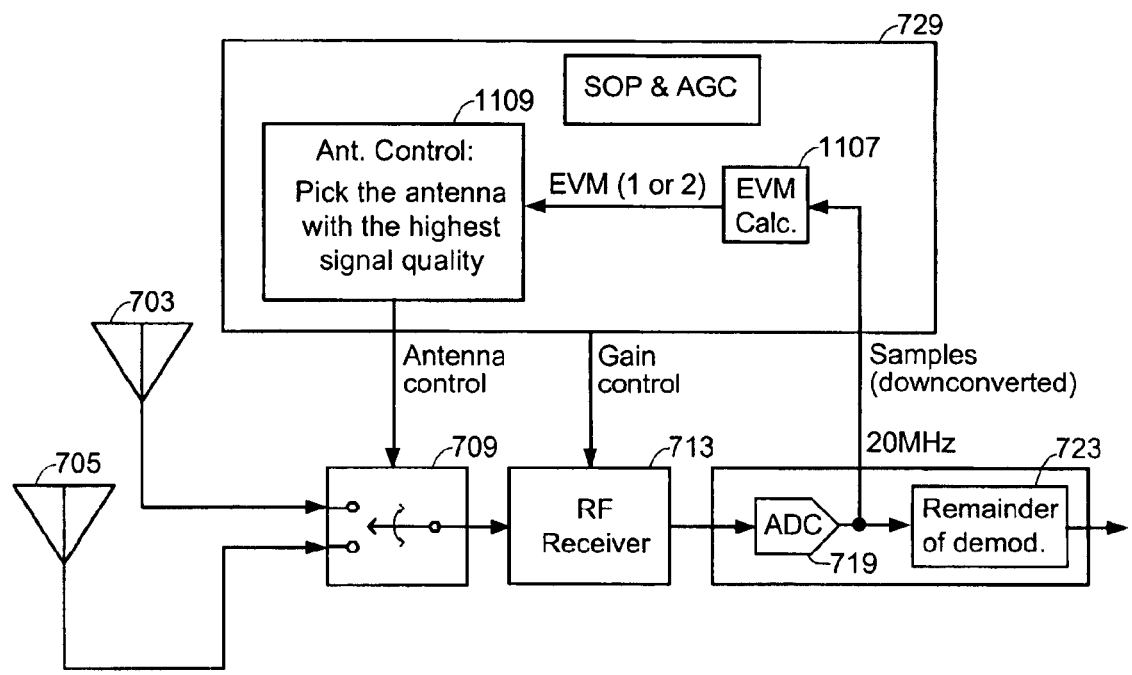
FIG. 11 shows a more practical yet still simplified block diagram of a receiving system that selects the antenna according to a measure of the signal quality related to the EVM.

FIG. 11 shows a more practical yet still simplified block diagram of a receiving system that selects the antenna according to a measure of the signal quality related to the EVM. The antenna select controller is part of the SOP, AGC and antenna selection circuit 729. The pre-AGC EVM is calculated by the EVM calculator 1107. The calculated EVM in each antenna is sequentially input to an antenna controller 1109 that generates an antenna select signal according to the superior calculated EVM. The antenna select signal is accepted by the antenna selector, e.g., switch 709.

Not shown in FIG. 11 are the transmit/receive duplexer, the downconverter, and other components, shown, for example, in the more detailed receiver block diagram of FIG. 8.

Operation of the EVM Calculator and Selector

The antenna controller 1109 (FIG. 11) selects a first antenna, and then obtains a measure of the signal quality for the first antenna, then switches to the second antenna and obtains a measure of the signal quality for the second antenna, then selects one of the antennas as the antenna for receiving from the remote station according to the signal quality measure.

The most accurate EVM estimate would require demodulating the packet and computing the EVM directly by comparing the measured symbol positions to the ideal symbol positions. In the embodiment described herein, the antenna diversity selection is carried out prior to AGC and prior to initial timing estimation that determines the timing of the short symbols. Thus, at this early stage in the short preamble period, the inventors chose to use an EVM calculator that approximates the EVM without requiring that the short symbol timing be determined and without demodulating. Of course alternate embodiments may use different methods for calculating the EVM.

In calculating a measure approximating the EVM without requiring accurate timing, an assumption is made that the EVM is due only to noise or colored interference; other EVM contributors are neglected. Of course, the method operates even if such other sources of error exist. The EVM calculator is simply less accurate under such conditions. Experiments demonstrated, however, that the antenna selection method works reasonably well even with this approximate measure of the EVM.

In this description, denote antenna 703 as antenna 1 and antenna 705 as antenna 2.

Under this assumption, in one embodiment, an approximate measure of the relative EVM is determined by determining the symbol vector magnitude (SVM) during the short sequences and the noise power per subcarrier prior to the short sequences.

Note that in practice, noise samples from only one of the two antennas are taken.

According to the IEEE 802.11 standard, only 12 out of the 52 subcarriers are used in the short sequences. In one embodiment, the SVMs for each antenna, e.g., antenna 1 are determined by gathering one-short symbol's worth of consecutive samples, i.e., 16 consecutive short sequence samples when sampling at 20 MHz, from antenna 1, $x_1[i]$ for $0 \leq i \leq 15$, and performing a discrete Fourier transform (DFT) on these samples. Specifically, in one embodiment, the symbol vector magnitudes per subcarrier are estimated by $$SVM_1[k] = \sqrt{\frac{3}{13}} \frac{1}{16} \left| \sum_{i=0}^{15} x_1[i] \exp\left(\frac{-j2\pi ki}{16}\right) \right|, \quad \text{Eq. 1}$$

for k=1, 2, 3, 4, 5, 6, 10, 11, 12, 13, 14, and 15. Only these twelve SVMs can be estimated during the short sequences because only 12 out of the 52 subcarriers are used in the short sequences. As a consequence of only 12 subcarriers being used in the short sequences, these 12 subcarriers have 13/3 times the power of the packet subcarriers to maintain constant signal power between the short sequences and the remainder of the packet when all 52 subcarriers are used. The factor $\sqrt{3/13}$ in Eq. 1 is used to adjust between the difference in the short sequence subcarrier power and packet subcarrier power. This is because the SVMs are assumed to be equal to the square root of the packet subcarrier powers.

The next step in calculating the relative EVM is to determine the subcarrier noise power. In one embodiment, it is assumed measurements from a first antenna—denoted antenna 1 here—is available.

In one embodiment, the symbol positions are only obtained post-AGC, and it is therefore the post-AGC noise power per subcarrier that is determined. Because in one version, the selection diversity decision is made pre-AGC, the post-AGC noise power cannot be directly measured, but can be estimated from the pre-AGC noise power, the pre-AGC signal power, and assuming an upper limit on the post-AGC signal to noise ratio (SNR). The pre-AGC noise power is estimated by taking a number, denoted N of pre-AGC noise samples from antenna 1, $x_n[i]$ for $0 \leq i \leq N-1$, some time before the start of packet (SOP) time as determined by the start of packet detector, and determining the mean square value of these N antenna 1 samples according to:

$$\frac{1}{N} \sum_{i=0}^{N-1} |x_n[i]|^2. \quad \text{Eq. 2}$$

In one embodiment, N=16 and a FIFO is included of samples such that the pre-SOP samples are available after the SOP time in order to determine the pre-SOP noise power.

The pre-AGC signal power is measured using antenna 1 according to $$\frac{1}{16} \sum_{i=0}^{15} |x_1[i]|^2, \quad \text{Eq. 3}$$

where $x_1[i]$ for $0 \leq i \leq 15$ are the antenna 1 short sequence samples used in Eq. 1. If the post-AGC SNR has an upper limit, denoted $SNR_{Limit}$, which is generally the case because of the AGC's trend to maintain a constant baseband signal level, the minimum noise power is:

$$\text{Minimum noise power} = \frac{\frac{1}{16}\sum_{i=0}^{15} |x_1[i]|^2}{SNR_{Limit}}, \quad \text{Eq. 4}$$

In one embodiment, the total noise power is determined as if there are two independent noise sources with noise powers given by Eq. 3 and Eq. 4. That is $$\text{Total noise power} = \frac{1}{N}\sum_{i=0}^{N-1} |x_n[i]|^2 + \frac{\frac{1}{16}\sum_{i=0}^{15} |x_1[i]|^2}{SNR_{Limit}}. \quad \text{Eq. 5}$$

Eq. 5 determines a measure of the total noise power (using antenna 1), but it is the subcarrier noise power that would be calculated (or a value assumed) to calculate the measure of the relative EVM. If the noise is spectrally flat additive white Gaussian noise (AWGN) within the sampling bandwidth, the noise power will be equally divided among the outputs of a DFT. The measured symbol positions are formed during the packet with a 64 point DFT, and thus the noise power per subcarrier will be 1/64 the total noise power. Therefore, the subcarrier noise power for antenna 1 ($SCNP_1$) is estimated by the equation $$SCNP_1 = \frac{1}{64}\left(\frac{1}{N}\sum_{i=0}^{N-1}|x_n[i]|^2 + \frac{\frac{1}{16}\sum_{i=0}^{15}|x_1[i]|^2}{SNR_{Limit}}\right). \quad \text{Eq. 6}$$

The relative EVM for packet 1, denoted $REVM_1$, is estimated by $$REVM_1 = \frac{\sqrt{SCNP_{Post\_AGC1}}}{12}\sum_k \frac{1}{SVM_1[k]}, \quad \text{Eq. 7}$$

for k=1, 2, 3, 4, 5, 6, 10, 11, 12, 13, 14, and 15. Following the same procedure for antenna 2, the relative EVM for antenna 2, denoted $REVM_2$, is also estimated. Once $REVM_1$ and $REVM_2$ for antennas 703 and 705, respectively, are calculated by REVM calculator 1107, antenna controller 1109 generates a control signal to the antenna selector 709 to select the antenna corresponding to the lower measure of the REVM.

Alternate Measures of the Relative EVM

While one embodiment determined the measure of the relative EVM according to Eqs. 1–7 as described above, different embodiments use different variations of the method of determining a measure of the relative EVM. The invention is not restricted to any particular method of determining the measure of the relative EVM, or an approximation thereof. The following variations to the method are only some of the variations possible.

In a first variation, the determination of a measure of the relative EVM does not require a determination of the noise, in the sense that an assumption is made that the noise is additive white noise and the same noise power appears at each receive antenna, i.e., that the noise is the same for each subcarrier and for each antenna. Thus, according to the first variation, the selection is made according to a measure:

$$REVM_m = \sum_k \frac{1}{SVM_m[k]}, \quad \text{Eq. 8}$$

where m=1 or 2, indicating the first or second antenna. This variation has an advantage that it is easy to implement. For example, a lot of the scale factors, e.g., sqrt(3/13), and many of the equations above, e.g. Eq. 5 for the noise power, become unimportant.

A second variation is almost identical to the above described with the help of Eqs. 1–7, but rather than the noise from antenna 1 being available, the method uses a measure of the noise from antenna 2. Thus, in this variation of the method, the noise in Eq. 2, Eq. 5, and Eq. 6 are from antenna 2, i.e., a swap is made from antenna 1 to antenna 2.

A third variation is the same as the above described with the help of Eqs. 1–7, but for this variation, measures of the noise are available from both antenna 1 and antenna 2. Thus, in this variation, the noise in Eq. 2, Eq. 5, and Eq. 6 are from the same antenna as for which the REVM is being calculated using Eq. 7.

A fourth variation uses an estimate of the power spectral density of the noise from antenna 1, and well as a power spectral density of the signal. Thus, one implementation of this method includes:

(a) Determining a 16 point FFT on the baseband noise in antenna 1 sometime before the start of packet while the receiver is set to its default gain settings. This provides a measure of the power spectral density of the noise. It is assumed that the power spectral density of the noise from antenna 1 applies also to antenna 2.

(b) Determining a 16 point FFT on the known second short symbol to determine a measure of the power spectral density of the signal using the 12 short symbol subcarriers.

(c) Assuming an upper bound on the baseband SNR, the post AGC subcarrier to noise ratio (SCNR) is estimated for each of the 12 short symbol subcarriers.

(d) A relative EVM is computed according to Eq. 7.

(e) The receive antenna with the lowest estimated error is selected.

We have found that this metric works well in a narrow-band-interference, e.g., in a colored interference environment, such as caused by microwave ovens or the presence of Bluetooth wireless devices, and so forth.

A fifth variation is similar to the fourth, but the power spectral density of the other antenna, antenna 2 is used and assumed for both REVM determinations.

A sixth variation is similar to the fourth, but the power spectral densities of each of the two antennas is determined, so that the relative EVM is computed according to Eq. 7 using noise power spectral densities of noise from the respective antennas.

Furthermore, in the above-described embodiment, the REVM determinations according to any of the variations, occur pre-AGC. In yet another set of variations, the determining of the measure of the REVM occur with signals post-AGC. For example, this may occur by carrying out AGC on a first antenna, obtaining the information needed to determine a measure of the relative EVM on the first antenna, carrying out AGC on the other, second antenna, the obtaining the information needed to determine a measure of the relative EVM on the second antenna. With this set of variations, the REVMs of the two antennas are obtained post-AGC, and compared to select the one antenna or the other.

The post-AGC variations may be particularly suitable, for example, if modifications were proposed and made to the present-day (2003) OFDM variants of the IEEE 802.11 standards with a longer short-symbol preamble to provide for the additional AGC.

Experimental Results

Walk-around tests carried out on Apr. 1, 2003 to compare the packet error rate (PER) for different access point (AP) to client distance in a typical office environment for several two-antenna receiver architectures.

An IEEE 802.11a transmitter was set up using a Sony/Tektronix AWG430 arbitrary waveform generator, Rohde & Schwarz SMIQ06B signal generator, and a vertically oriented dipole antenna 3.5 feet from the floor. The output signal power delivered to the transmit antenna was approximately 6 dBm. The transmitter was mounted on a turntable that is set into motion during testing to collect a wide range of channel realizations at a particular location.

The various receiver architectures used two identical receive radios. Each receive radio had a dipole antenna at its RF test port. A differential probe was connected to each radio across the baseband output (10 to 30 MHz low IF "baseband" output). The outputs from the differential probes was input to two boards sampling at 100 MHz. A filter/downconverter generated I and Q samples at 20 MHz.

The separation between the two antennas was varied through 7 different antenna configurations during testing. The antenna configurations included both antennas vertical with 0.5λ spacing, 1.0λ spacing, 1.5λ spacing, 2.0λ spacing, 3.0λ spacing, and 4.0λ spacing as well as one antenna vertical and one antenna horizontal with 0.5λ spacing. The antennas were held at approximately 1.5 feet from the ceiling during testing.

The transmitter and receiver were operated at 5.14 GHz. This frequency was selected rather than one of the approved U-NII frequencies to reduce the interference from 802.11a WLAN users within the building. All testing was done with 1000 byte 54 Mbps packets and the PER statistics were determined from 100 packets per location/antenna configuration combination.

Figure 1:
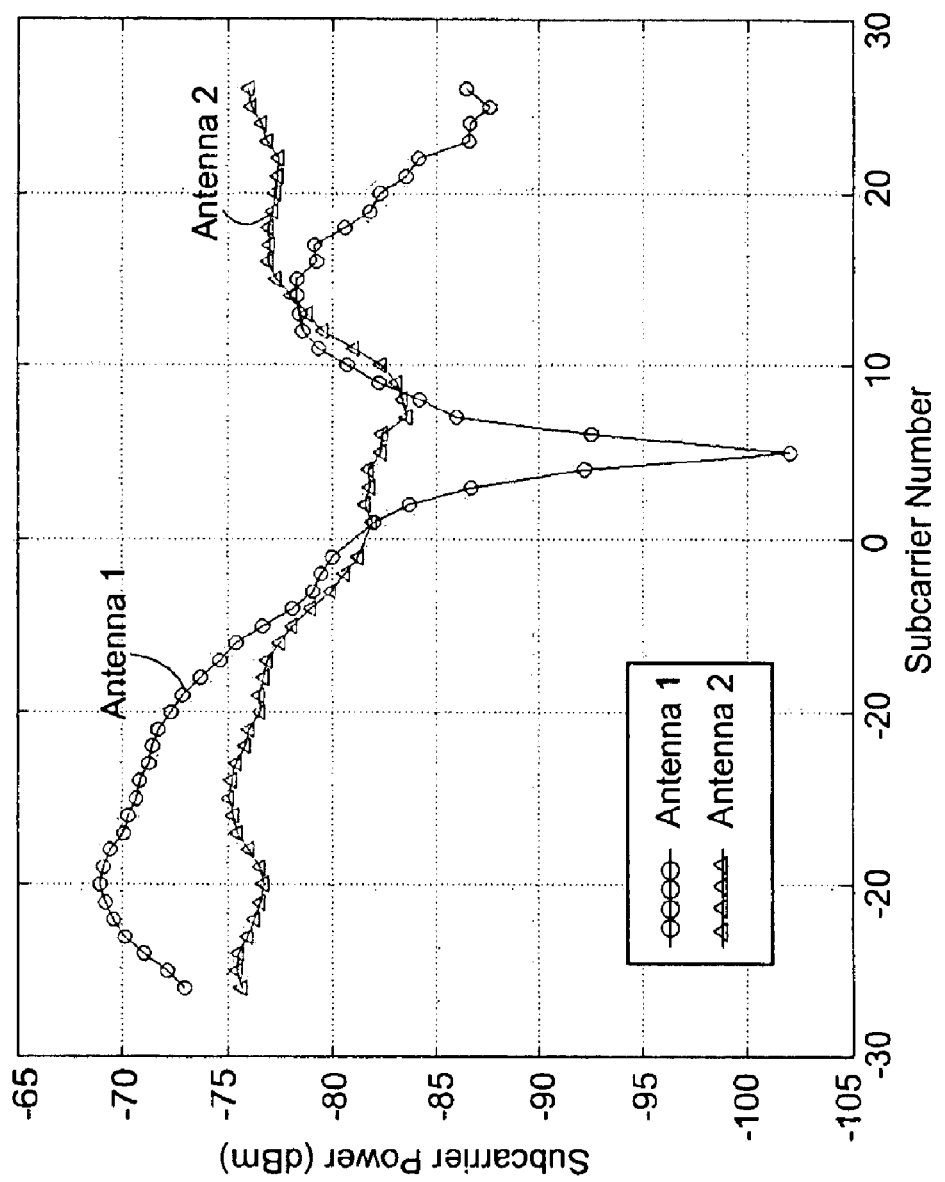
FIG. 1 shows the subcarrier powers observed for the same packet received through two vertically oriented dipole antennas separated by a half-wavelength in an office environment to show how the subcarrier channels vary with frequencies, and do so differently for the signals received at the two antennas.
Figure 2:
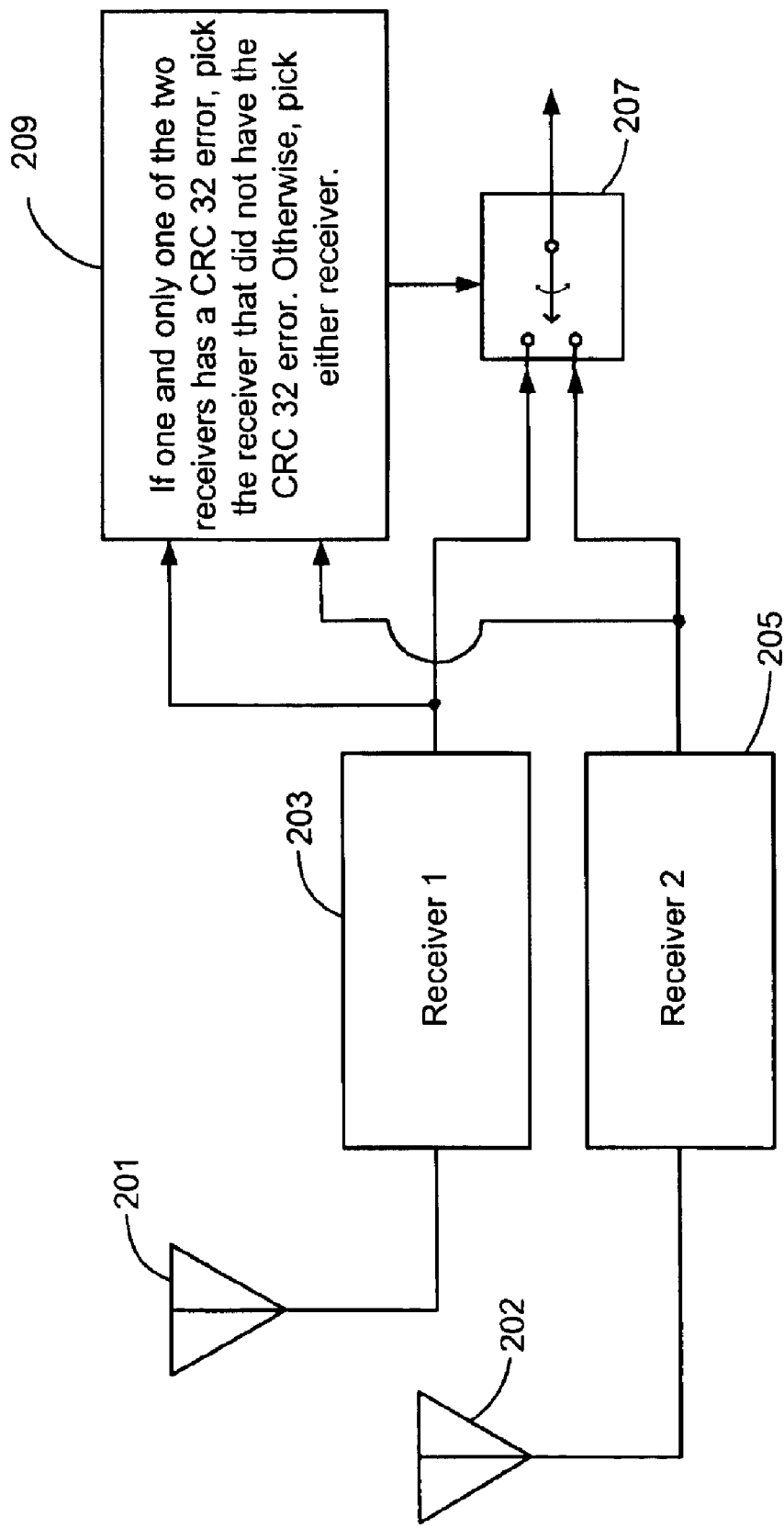
FIG. 2 shows a simplified block diagram of a wireless receiving system that includes two receivers and compares the received signals after demodulation to select the antenna to use for reception.
Figure 3:
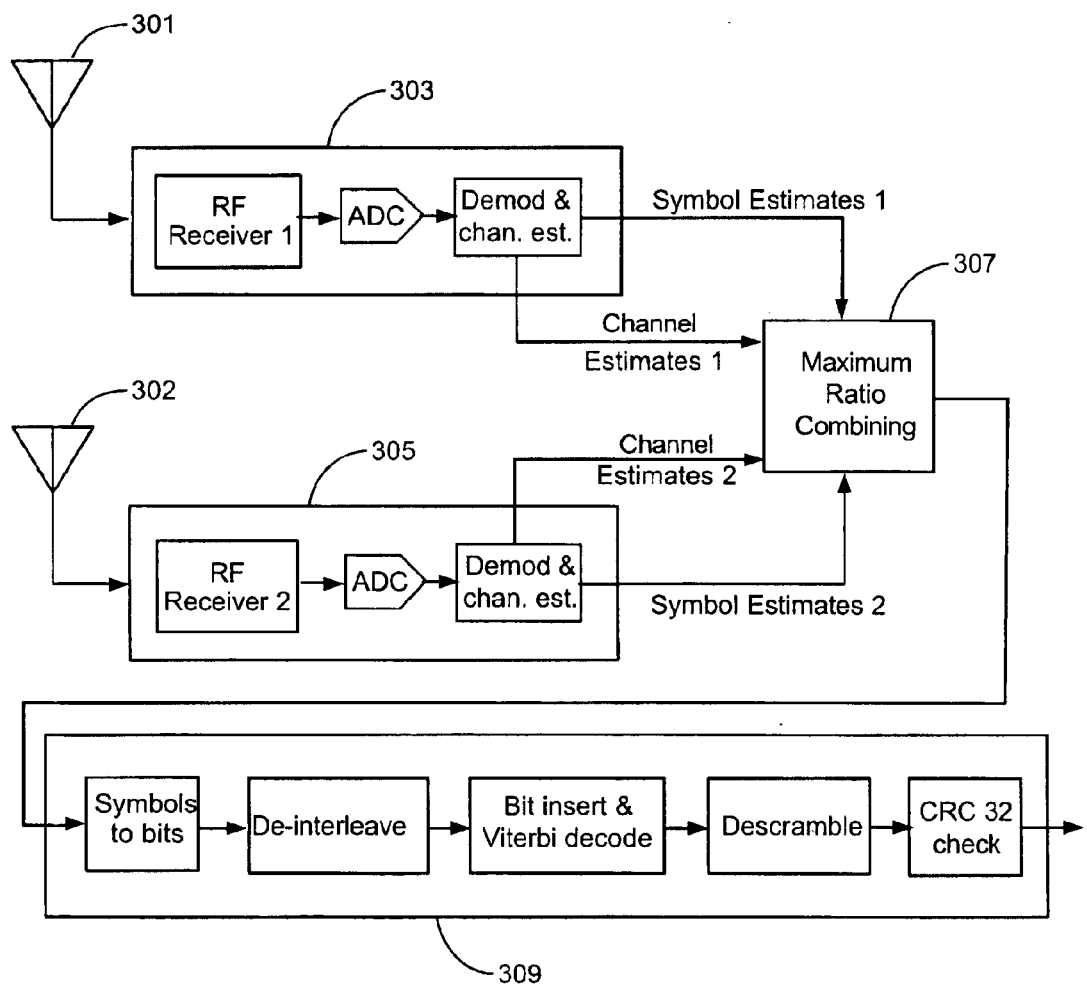
FIG. 3 shows a simplified block diagram of a wireless receiving system that combines signals received at each of a plurality of antennas.
Figure 4:
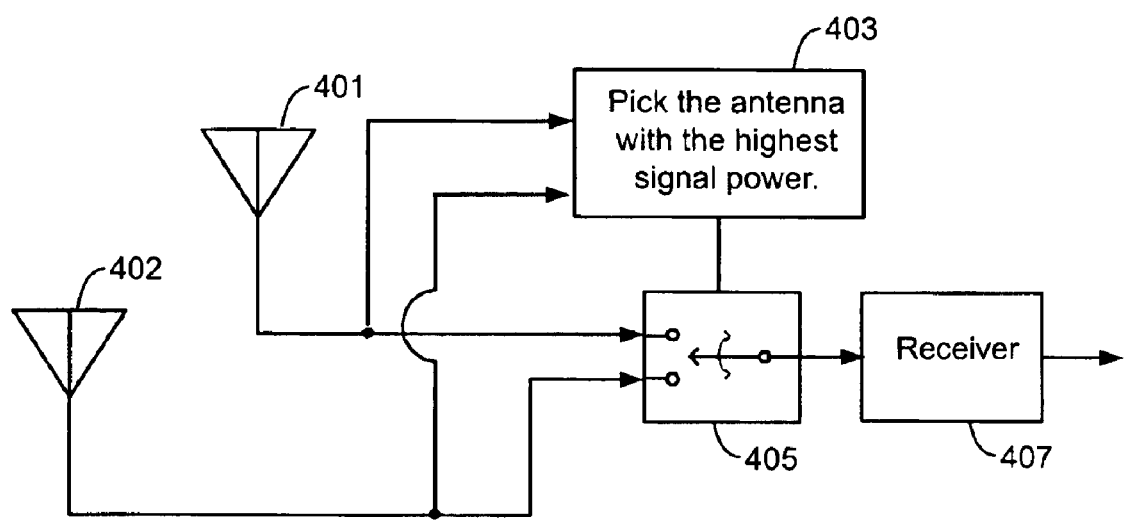
FIG. 4 shows simplified conceptual design of a wireless receiving system that selects the antenna according to the signal strength.
Figure 5:
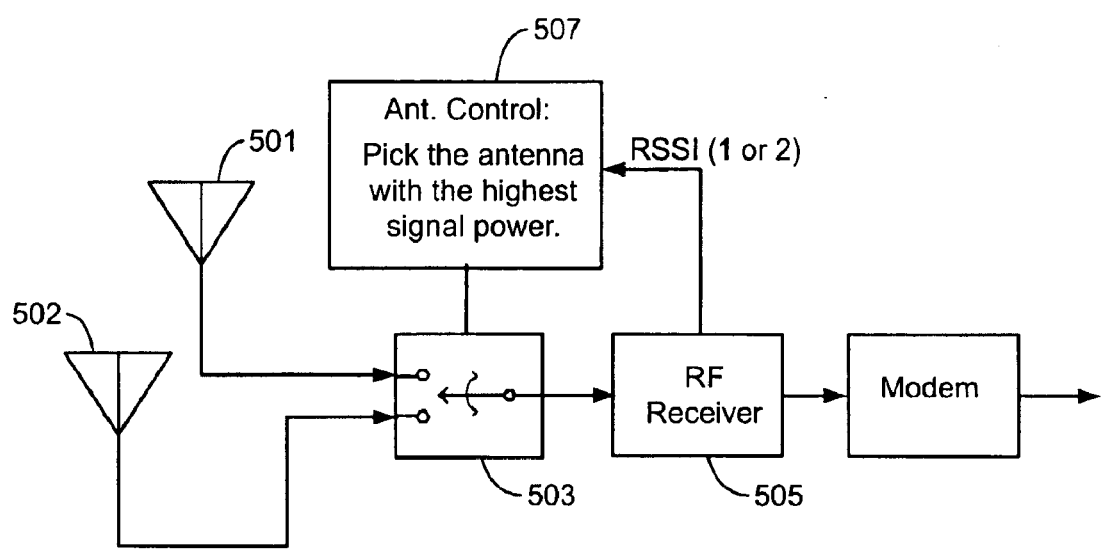
FIG. 5 shows a more practical yet still simplified block diagram of a receiving system that selects the antenna according to the RSSI.

For this we compared the following receiver architectures:

1. A first single antenna receiver.
2. A second single antenna receiver.
3. An optimal packet error rate two-antenna diversity receiver such as shown in FIG. 2, using the first and second receivers. Because both receive paths are demodulated independently in the single antenna receiver architecture, it was possible to determine what the PER would be if there was a perfect selection diversity metric that always makes the correct decision. This is equivalent to having two receivers operating in parallel, demodulating both receive paths independently, and selecting the data set according to the CRC 32 result as shown in FIG. 2. This selection diversity technique was included to show the lower bound on achievable PER with selection diversity techniques.
4. A maximum ratio combining (MRC) two-antenna diversity receiver such as shown in FIG. 3, using parts of the first and second receivers. This receiver architecture combined the symbol estimates from both receivers on a subcarrier by subcarrier basis using the MRC algorithm to improve the symbol accuracy. The MRC algorithm requires an estimate of the SCNR for each subcarrier of each receive path in order to compute the combining weights. In this particular implementation, the subcarrier signal power is determined from the channel estimates and the noise power is determined from an EVM measurement of the signal symbol. This implementation is advantageous from the perspective that symbol error contributions such as channel estimate inaccuracies, intercarrier interference, frequency drift, etc. are treated as noise contributions and therefore aid in determining the optimal combining weights by the MRC algorithm.
5. A signal level selection two-antenna diversity receiver such as shown in FIG. 4 according to which the antenna was selected according to the RSSI. The signal power (RSSI) was determined from 20 MHz downconverted I,Q samples of the received signal, in particular, from the 16 samples of the second short symbol. Note that the short symbol samples need be on an exact symbol boundaries since the waveform is periodic. The second short symbol is received before the gain is adjusted by the AGC and thus happens when the radio is using its default gain settings. Because both radios have approximately the same receiver gain when using the default gain settings, the signal power of the second short symbol provides a good indication of which receive path corresponds to the highest signal power. This methodology is directly analogous to the use of the modem's RSSI signal for power determination, but does not require an additional ADC to read the radio's RSSI.
6. An embodiment of a signal-quality based two-antenna diversity receiver that uses a measure of the relative EVM for antenna selection. This selection diversity technique is based on estimating the channel response from the second short symbol and calculating the relative EVM as previously discussed. The receive path corresponding to the lowest error is then selected. An overview of the algorithm is as follows:
   (a) The pre-AGC noise power is calculated according to Eq. 1 with N=16.
   (b) A 16 point FFT was performed on the second short symbol to estimate the power in the subcarriers −24, −20, −16, −12, −8, 4, 4, 8, 12, 16, 20, and 24.
   (c) Assuming an upper bound on the baseband SNR, the post AGC subcarrier to noise ratio (SCNR) is estimated for each of the 12 short symbol subcarriers.
   (d) The relative EVM estimate was computed according to Eq. 7.
   (e) The receive antenna with the lowest estimated error is selected.

Figure 12:
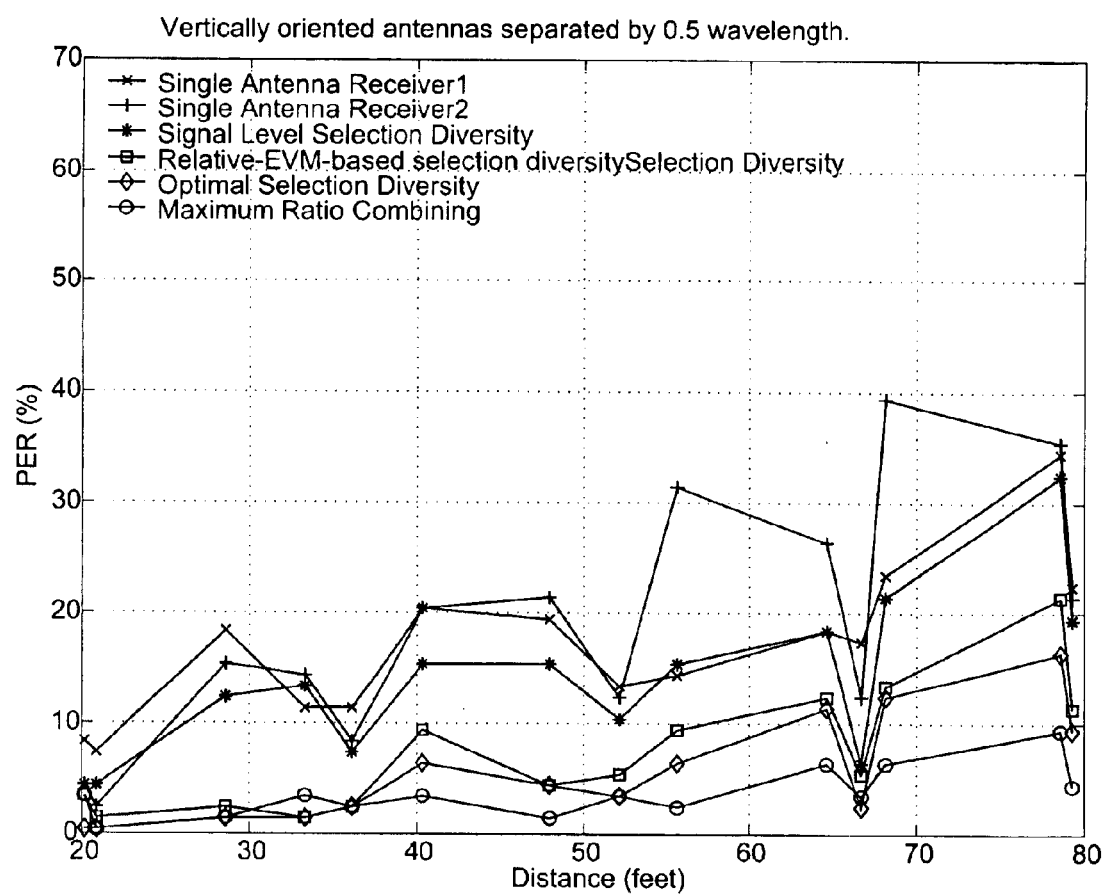
FIGS. 12, 13, and 14 show the packet error rate (PER) versus distance for several receiver implementations, including an implementation that selects the receive antenna according to the measure of the relative EVM, for three different receive antenna separations.
Figure 13:
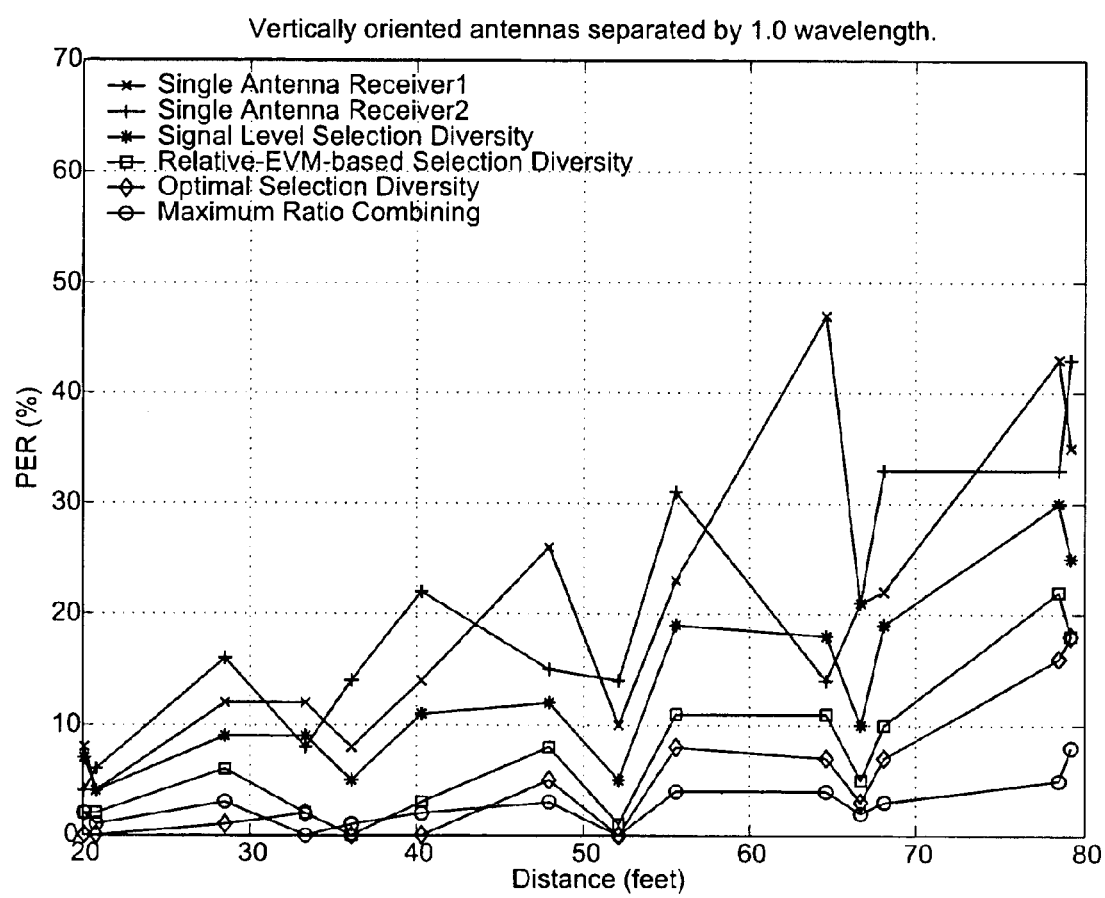
Figure 14:
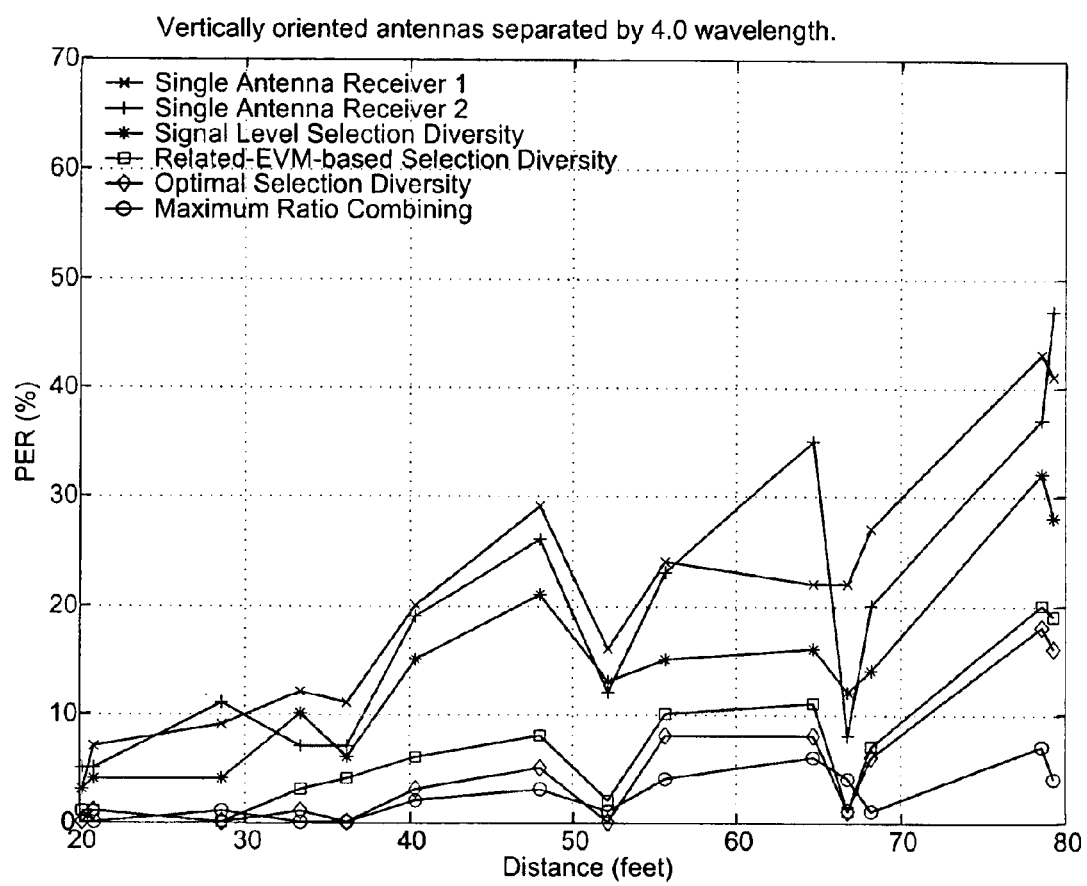

FIGS. 12, 13, and 14 show the packet error rate (PER) versus distance for each of the receiver implementations discussed above. Each figure corresponds to a particular antenna separation. FIG. 13 shows PER vs. distance for the two receive antennas oriented vertically and separated by ½ λ. Signal level selection diversity shows almost no improvement over a single antenna receiver at distances less than 40 feet, but shows some improvement at distances greater than 40 feet. The selection diversity method of the invention maintains a PER less than 5% for distances less than 40 feet, but the PER increases to 20% as the distance increases to 80 feet. The inventive EVM-based selection diversity PER is clearly lower than signal level selection diversity.

These results indicate that ½λ antenna spacing is sufficient to permit improved performance using the selection diversity technique of the invention compared to a single antenna receiver in an indoor office environment.

FIGS. 13 and 14 show PER vs. distance for the two receive antennas oriented vertically and separated by 1 and 4λ, respectively. The trends are very similar to those seen in FIG. 12. There appears to be very little, if any, benefit from the additional antenna spacing.

Transmitter Antenna Selection

According to another aspect of the invention, a station receiving a signal from a remote station and selecting a particular antenna for the receiving according to the selection method described herein, that is, based on a measure of the received signal quality, e.g., EVM, selects the same antenna for transmitting to the remote station.

We tested selecting the antenna for transmitting based on the received signal quality and found that this provided an advantage over having a single antenna transmitter.

Antenna Selection According to a Plurality of Metrics

In another embodiment, more than one criterion is used to select the antenna from the set of receive antennas. In one embodiment, one such other metric is the carrier-to-noise ratio (CNR) at the PHY. Concurrently filed U.S. patent application 10/698,703 titled "INITIAL TIMING ESTIMATION IN AN WIRLESS NETWORK RECEIVER to inventors Hart et al., filed Oct. 31, 2003, and assigned to the assignee of the present invention, describes how the CNR of a packet may be estimated from an average power measure determine from samples of the received data after a start-of-packet indication and from an average power measure determine from samples of the received data before such a start-of-packet indication. Such concurrently filed U.S. patent application Ser. No. 10/698,703 is incorporated herein by reference.

In yet another embodiment, the receiver includes a filter in the receive path, and provides a measure of the RSSI both pre-filter and post filter. Comparing the pre- and post-filter signal strengths provides a measure of the amount of adjacent channel interference. See U.S. patent application Ser. No. 10/622,175 titled "ADAPTIVE AGC IN A WIRELESS NETWORK RECEIVER," filed Jul. 17, 2003 to inventors Adams, et al., and assigned to the assignee of the present invention, describes such a receiver. In yet another embodiment, one of the other metrics used is a comparison of the in-channel carrier to adjacent channel interference.

Thus, a method and apparatus has been disclosed for selecting a receive antenna according to a measure of the received signal quality, in particular, according to a measure for the pre-AGC relative EVM of the received signal.

"Variants of the IEEE 802.11 standard" as used herein means the variants and proposed variants of the IEEE 802.11 standard. Variants are versions defined in clauses of the standard and proposed amendments of the standard.

It should be appreciated that although the invention has been described in the context of variants of the IEEE 802.11 standard that use OFDM packets, the invention is not limited to such contexts and may be utilized in various wireless network applications and systems, for example in a system that uses packets other than OFDM packets, e.g., the IEEE 802.11b standard, or in a network that conforms to a standard other than IEEE 802.11. Furthermore, the invention is not limited to any one type of architecture or protocol, and thus, may be utilized in conjunction with one or a combination of other architectures/protocols. For example, the invention may be embodied in transceivers conforming to other standards and for other applications, including other WLAN standards, bluetooth, GSM, PHS, CDMA, and other cellular wireless telephony standards.

While one embodiment of the OFDM receiver (FIG. 8) accepts a low IF signal that requires further downconversion to obtain baseband I,Q signals, in another embodiment, the analog portion provides baseband I,Q signals that require no further downconversion.

While one embodiment of the station (FIG. 7) is for half-duplex operation, and includes a transmit/receive switch 204, other embodiments are for full duplex operation.

While one embodiment of the method determined and compares measures of the relative EVMs pre-AGC, another embodiment determined and compares measures of the relative EVMs post-AGC.

The phrase "a relative EVM calculator that determines a measure of the EVM" and similar phrases include the case of relative EVM calculator 1107 described above.

While the embodiments above use a relative EVM calculator that determines a measure of the EVM that includes a square root operation, alternate embodiments, avoid the square root operation and determine a measure that is proportional to the square of the EVM described above. Thus, other embodiments may use other measures of the EVM. All such other measures of the EVM, so long as they are monotonic functions of an approximation of the EVM, are within the scope of the invention.

Note that these days, circuits such as the digital circuits that provide the antenna selection method are often implemented as in a circuit that includes a processing system including one or more processors. The processing system implements the method by executing a set of instructions. That is, one embodiment of each of the methods described herein is in the form of a computer program that executes on a processing system, e.g., a one or more processors that are part of a receive signal processor of a wireless station. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method in a station of a wireless network, the method comprising:
    wirelessly receiving data via each of a plurality of antennas, the data corresponding to a packet of information transmitted from a remote station;
        sampling the received data corresponding to the received packet to form data samples;
    determining a measure of signal quality from samples of the received data for each of the antennas; and
    selecting one of the plurality of receive antennas as the antenna for receiving from the remote station, the selecting according to the determined measure of signal quality,
    wherein the determining of the measure of signal quality is prior to carrying out automatic gain control (AGC) for the data corresponding to the packet, and
    wherein the determining of the measure of signal quality includes determining a measure of the relative EVM from samples of the received data corresponding to part of the packet.

2. A method as recited in claim 1, wherein the plurality of antennas are further usable for transmitting, the method further including:
    selecting the same antenna for transmitting to the remote station as the selecting stop selects as the antenna for receiving from the remote station.

3. A method as recited in claim 1, wherein the selecting uses at least one additional criterion for selecting the antenna for receiving from the remote station.

4. A method as recited in claim 3, wherein the at least one additional criterion includes the carrier to noise ratio.

5. A method as recited in claim 1, wherein the packet conforms to one of the OFDM variants of the IEEE 802.11 standard or a derivative thereof, such that the packet includes a preamble that includes a short symbol part that has a sequence of short symbols, and wherein the measure of the relative EVM is from samples of the short symbol part of the preamble.

6. A method as recited in claim 5, wherein determining the measure of the relative EVM includes determining a measure that varies monotonically with the symbol vector magnitude (SVM) in the short symbol part.

7. A method as recited in claim 6, wherein determining a measure that varies monotonically with the symbol vector magnitude (SVM) includes performing a discrete Fourier transform on samples corresponding to a short symbol.

8. A method as recited in claim 6, wherein determining the measure of the relative EVM assumes that the noise power per subcarrier in the short symbol part is the same for each subcarrier and for each antenna, such that determining the measure of the relative EVM does not require determining of a measure that varies monotonically with the noise power per subcarrier.

9. A method as recited in claim 6, wherein determining the measure of the relative EVM further includes determining a measure that varies monotonically with the noise power per subcarrier in the short symbol part.

10. A method as recited in claim 9, wherein determining a measure that varies monotonically with the noise power per subcarrier is carried out for signals received via only one of the antennas.

11. A method as recited in claim 9, wherein determining a measure that varies monotonically with the noise power per subcarrier is carried out for signals received via each of the antennas.

12. A method as recited in claim 9, wherein determining a measure that varies monotonically with the noise power per subcarrier includes performing a discrete Fourier transform on samples corresponding noise.

13. A method as recited in claim 9, wherein determining a measure that varies monotonically with the noise power per subcarrier in the short symbol part includes determining a measure of the average signal power prior to a packet arriving.

14. A method as recited in claim 9, wherein determining a measure that varies monotonically with the noise power per subcarrier in the short symbol part includes determining the noise power prior to AGC, the signal power prior to AGC, and assuming an upper limit on the post-AGC signal to noise ratio (SNR).

15. An apparatus for inclusion in a station of a wireless network, the apparatus comprising:
    a plurality of antennas;
    a selector to select one of the plurality of antennas;
    a radio receiver coupled to one of the plurality of antennas via the selector, the receiver to wirelessly receive data corresponding to a packet of information transmitted from a remote station, the receiver including an analog-to-digital converter producing data samples of signals received at the station from the remote station corresponding to the packet;
    a signal quality calculator coupled to the receiver to determine a measure of the received signal quality from samples of the received data from the remote station; and
    an antenna controller coupled to the signal quality calculator and to the selector to select one of the antennas as the antenna for receiving from the remote station according to the calculated signal quality,
    wherein the signal quality calculator determines the measure of signal quality prior to automatic gain control (AGC) for the data corresponding to the packet, and
    wherein the determining of the measure of signal quality by the signal quality calculator includes determining a measure of the relative EVM from samples of the received data corresponding to part of the packet.

16. An apparatus as recited in claim 15, wherein the packet conforms to one of the OFDM variants of the IEEE 802.11 standard or a derivative thereof, such that the packet includes a preamble that includes a short symbol part that has a sequence of short symbols, and wherein the measure of the relative EVM is from samples of the short symbol part of the preamble.

17. An apparatus as recited in claim 16, wherein the determining of the measure of signal quality by the signal quality calculator includes determining a measure that varies monotonically with the symbol vector magnitude (SVM) in the short symbol part.

18. An apparatus as recited in claim 17, wherein determining the measure of the relative EVM assumes that the noise power per subcarrier in the short symbol part is the same for each subcarrier and for each antenna, such that determining the measure of the relative EVM does not require determining of a measure that varies monotonically with the noise power per subcarrier.

19. An apparatus as recited in claim 17, wherein the determining of a measure that varies monotonically with the symbol vector magnitude (SVM) includes performing a discrete Fourier transform on samples corresponding to a short symbol.

20. An apparatus as recited in claim 17, wherein determining the measure of the relative EVM further includes determining a measure that varies monotonically with the noise power per subcarrier in the short symbol part.

21. An apparatus as recited in claim 20, wherein determining a measure that varies monotonically with the noise power per subcarrier is carried out for signals received via only one of the antennas.

22. An apparatus as recited in claim 20, wherein determining a measure that varies monotonically with the noise power per subcarrier is carried out for signals received via each of the antennas.

23. An apparatus as recited in claim 20, wherein determining a measure that varies monotonically with the noise power per subcarrier includes performing a discrete Fourier transform on samples corresponding noise.

24. An apparatus as recited in claim 20, wherein determining a measure that varies monotonically with the noise power per subcarrier in the short symbol part includes determining a measure of the average signal power prior to a packet arriving.

25. An apparatus as recited in claim 20, wherein determining a measure that varies monotonically with the noise power per subcarrier in the short symbol part includes determining the noise power prior to AGC, the signal power prior to AGC, and assuming an upper limit on the post-AGC signal to noise ratio (SNR).

26. An apparatus in a station of a wireless network, the apparatus comprising:

means for wirelessly receiving data via each of a plurality of antennas, the data corresponding to a packet of information transmitted from a remote station;

means for sampling the received data corresponding to the received packet to form data samples;

means for determining a measure of signal quality from samples of the received data for each of the antennas; and means for selecting one of the plurality of receive antennas as the antenna for receiving from the remote station, the selecting according to the determined measure of signal quality, wherein the determining of the measure of signal quality is prior to carrying out automatic gain control (AGC) for the data corresponding to the packet, and wherein the determining of the measure of signal quality includes determining a measure of the relative EVM from samples of the received data corresponding to part of the packet.

27. An apparatus as recited in claim 26, wherein the plurality of antennas are further usable for transmitting, the apparatus further including:

means for selecting one of the antennas for transmitting by selecting the same antenna for transmitting to the remote station as was selected as the antenna for receiving from the remote station.

28. An apparatus as recited in claim 26, wherein the selecting uses at least one additional criterion for selecting the antenna for receiving from the remote station.

29. An apparatus as recited in claim 28, wherein the at least one additional criterion includes the carrier to noise ratio.

30. An apparatus as recited in claim 26, wherein the packet conforms to one of the OFDM variants of the IEEE 802.11 standard or a derivative thereof, such that the packet includes a preamble that includes a short symbol part that has a sequence of short symbols, and wherein the measure of the relative EVM is from samples of the short symbol part of the preamble.

31. An apparatus as recited in claim 30, wherein determining the measure of the relative EVM includes determining a measure that varies monotonically with the symbol vector magnitude (SVM) in the short symbol part.

32. An apparatus as recited in claim 31, wherein determining the measure of the relative EVM assumes that the noise power per subcarrier in the short symbol part is the same for each subcarrier and for each antenna, such that determining the measure of the relative EVM does not require determining of a measure that varies monotonically with the noise power per subcarrier.

33. An apparatus as recited in claim 31, wherein determining a measure that varies monotonically with the symbol vector magnitude (SVM) includes performing a discrete Fourier transform on samples corresponding to a short symbol.

34. An apparatus as recited in claim 31, wherein determining the measure of the relative EVM further includes determining a measure that varies monotonically with the noise power per subcarrier in the short symbol part.

35. An apparatus as recited in claim 34, wherein determining a measure that varies monotonically with the noise power per subcarrier is carried out for signals received via only one of the antennas.

36. An apparatus as recited in claim 34, wherein determining a measure that varies monotonically with the noise power per subcarrier is carried out for signals received via each of the antennas.

37. An apparatus as recited in claim 34, wherein determining a measure that varies monotonically with the noise power per subcarrier includes performing a discrete Fourier transform on samples corresponding noise.

38. An apparatus as recited in claim 34, wherein determining a measure that varies monotonically with the noise power per subcarrier in the short symbol part includes determining a measure of the average signal power prior to a packet arriving.

39. An apparatus as recited in claim 34, wherein determining a measure that varies monotonically with the noise power per subcarrier in the short symbol part includes determining the noise power prior to AGC, the signal power prior to AGC, and assuming an upper limit on the post-AGC signal to noise ratio (SNR).

* * * * *

UNITED STATES PATENT AND TRADEMARK OFFICE
CERTIFICATE OF CORRECTION

PATENT NO. : 6,922,549 B2
DATED : July 26, 2005
INVENTOR(S) : Lyons et al.

It is certified that error appears in the above-identified patent and that said Letters Patent is hereby corrected as shown below:

Title page,
Item [57], ABSTRACT,
Line 1, kindly change "Describe" to -- Described --.

Column 2,
Line 20, kindly change "an FFI processor" to -- an FFT processor --.

Column 4,
Line 47, kindly change "signal that accounts" to -- signal quality that accounts --.
Line 48, kindly change "interface." to -- interference. --.

Column 6,
Line 35, kindly change "cordic in one" to -- a cordic in one --.

Column 17,
Line 39, kindly change "the selecting stop" to -- the selecting step --.

Signed and Sealed this

Thirteenth Day of September, 2005

JON W. DUDAS
*Director of the United States Patent and Trademark Office*